Patented June 15, 1948

2,443,217

UNITED STATES PATENT OFFICE 2,443,217

PRODUCTION OF READILY POLYMERIZABLE VINYL AROMATIC COMPOUNDS

James L. Amos, Midland, and Frederick J. Soderquist, Bay City, Mich., assignors to The Dow Chemical Company, Midland, Mich., a corporation of Delaware No Drawing. Application July 30, 1945, Serial No. 607,908

16 Claims. (Cl. 260—669)

1

This invention concerns an improved method for the production of alkenyl-aromatic compounds having the general formula:

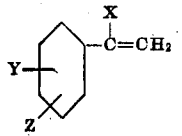

wherein X represents hydrogen or the methyl radical, Y and Z each, independently of the other, represents hydrogen, a halogen, or an alkyl or alkenyl radical containing less than four carbon atoms, and at least one of the substituents X, Y and Z is other than hydrogen. As will be evident from the general formula, such alkenyl-aromatic compounds are substituted-styrenes having molecular weights which exceed that of styrene by at least 14. The invention pertains especially to the production of substituted styrenes, having said formula, which readily polymerize, or copolymerize with other styrene compounds, to form products which are insoluble, or only sparingly soluble, in the corresponding monomers, or in benzene or other usual solvents for polystyrene. It pertains more particularly to the production of divinylbenzene and mixtures thereof with other vinyl aromatic compounds.

The formation of alkenyl-aromatic compounds by the pyrolysis of alkyl aromatic compounds, e. g. at temperatures in order of from 500° to 850° C., is well known and various methods for carrying out such pyrolytic reactions have been proposed. The known methods vary as regards the use of gaseous diluents such as nitrogen, steam, or carbon dioxide in the reaction mixture, or the use of any of a variety of catalysts, such as aluminum oxide or activated charcoal, to promote the reaction. However, they involve a common procedure of passing vapors of an alkyl-aromatic hydrocarbon, alone or in admixture with a gaseous diluent, through a reaction chamber where they are heated to the pyrolysis temperature and thence to condensers where the vapor mixture is cooled to condense the aromatic components thereof. Styrene is manufactured by such procedure.

Although the known procedure just outlined is satisfactory for the manufacture of styrene, serious operating difficulties are encountered when attempt is made to produce, on a large scale, substituted styrenes having the above general formula by similar procedure. During the pyrolysis of alkylated benzene compounds to form these substituted styrenes, the latter undergo appreciable polymerization, condensation, or copolymerization with other components of the pyrolysis mixture, to form solid resinous substances. The latter, which are poor conductors of heat, accumulate on the inner surfaces of the reactor and the condenser or other heat exchanger, where they reduce the efficiency of heat exchange, interfere with the flow of fluids and ultimately cause plugging. Pyrolysis mixtures comprising a polyvinyl aromatic compound such as divinyl-benzene, trivinylbenzene, or ethyl-divinylbenzene are particularly difficult to handle, since the polymers which are formed are usually infusible and substantially insoluble in benzene and other solvents for polystyrene and cannot readily be removed. In our past attempts to produce divinyl-benzene by such procedure, it has been necessary to retube a condenser which became plugged with the polymer.

Furthermore, the pyrolysis reaction to form a styrene compound is rarely complete in a single pass through a pyrolysis chamber and the unreacted alkylbenzene compound is usually separated from the reaction products and returned as feed material to the pyrolysis. The recycled alkylbenzene compound usually carries with it a minor amount, e. g. from 0.5 to 15 per cent by weight or thereabout, of the styrene compound formed by the pyrolysis. Such usual introduction of a minor amount of a styrene compound in the feed mixture appears to accelerate the formation and accumulation of solid polymeric material in the reactor and heat exchange units and to accentuate the operating difficulties which result.

Peculiarly, although such accumulations of polymer in the reaction system and the resultant operating difficulties have invariably been encountered in our attempts to produce substituted styrenes having the above general formula by conventional pyrolysis procedures, they are not experienced in the manufacture of styrene itself. Evidently styrene does not polymerize as readily or extensively under the operating conditions as do said substituted styrenes. It is also probable that any polystyrene which may be formed in the pyrolysis, or during condensation of the pyrolysis mixture, remains dissolved in the other components of the mixture and is continuously swept from the system, whereas the polymers and copolymers of the aforementioned substituted styrenes separate from the mixtures in which they are formed and accumulate as solids in the system. In this connection, it may be mentioned that, at least in some instances, the polymers of the substituted styrenes which accumulate during the pyrolysis are different in properties from those formed by polymerizing the same substituted styrenes under usual polymerization conditions, e. g. at 100° C., or in the presence of benzoyl peroxide or other polymerization catalysts. For instance, the solid resinous material which accumulates during the pyrolysis of isopropylbenzene (containing a minor amount of isopropenylbenzene) to form additional isopropenylbenzene (i. e. alpha-methyl-styrene) is only sparingly soluble in isopropylbenzene whereas the polymers of isopropenylbenzene prepared by conventional polymerization methods are readily soluble in the same solvent.

During our research on the the pyrolysis of alkylated benzene compounds to form the aforementioned substituted styrenes, we discovered that the formation and accumulation of polymeric material inside the reaction system may be curtailed, or avoided, by introducing a volatile polymerization inhibitor into the reaction vapors prior to condensing the products. The discovery that polymerization inhibitors are effective for the purpose was surprising in view of the fact that the reaction vapors are at temperatures far higher than those at which polymerization inhibitors are usually employed and that vinyl aromatic compounds have frequently been polymerized at elevated temperatures in the presence of inhibitors.

The inhibitors may with advantage be introduced into the reaction system at any point preceding condensation of the products from the pyrolyzed mixture. When introduced into the feed to the reaction zone they are effective in preventing an accumulation of solid polymers at any point in the reaction system. However, the inhibitors differ as to retention of the inhibiting action during passage through the pyrolysis zone and in some instances it is necessary to introduce a considerable amount, e. g. 1 per cent by weight or more, of inhibitor into admixture with the alkyl aromatic starting material in order to obtain satisfactory inhibition of polymerization during cooling and condensation of the reaction products. On the other hand polymerization during condensation may satisfactorily be avoided by introducing a small amount, e. g. 1 per cent or less, of any of a variety of inhibitors into the vapors within, or issuing from the reaction zone. In some instances it may be advantageous to introduce inhibitors at two separate points in the system, e. g. into the feed to the reaction and also into the reacted vapors prior to condensing the products.

A variety of volatile inhibiting agents which may be employed in the ways just described are known to the art. Examples of suitable inhibitors are hydroquinone, quinone, 4-methyl-catechol, 4-tertiary-butyl-catechol, 4-tertiary-amyl-catechol, 4-octyl-catechol, cyclohexyl-catechol, 3-methyl-catechol, 3-5-di-(tertiary-butyl)-catechol, 3-phenyl-catechol, and halonitrophenols such as 2-chloro-4-nitrophenol, 2-bromo-4-chloro-6-nitrophenol, 2.4-dichloro-6-nitrophenol, 2.4-dibromo-6-nitrophenol, or 4-chloro-2.6-dinitrophenol, etc. In most instances less than 5 per cent of inhibitor, based on the weight of the aromatic compound subjected to the pyrolysis, is sufficient to prevent the formation and accumulation of more than a minor and inconsequential amount of polymer within the system beyond the point of feed of the inhibitor and in some instances as little as 0.001 per cent of an inhibitor suffices. In practice, we employ inhibitors in amounts within the limits just stated and preferably in amount corresponding to between 0.1 and 1 per cent of the weight of the aromatic material subjected to the pyrolysis.

Halo-nitrophenols, such as those mentioned above, are particularly effective in preventing polymerization within the reaction system. Even when introduced into the feed material in the preferred proportions just stated, they exert an inhibiting action which persists both during the pyrolysis and during subsequent cooling of the reaction vapors to condense the products. Peculiarly, a considerable portion of the halo-nitrophenol is lost, apparently by decomposition, during the pyrolysis. Whether the continued inhibiting action is due to the relatively small amount of halo-nitrophenol remaining unchanged, or to an inhibiting action of its decomposition products, is not known.

Except for the step of introducing a polymerization inhibitor into the reaction vapors prior to condensing the pyrolysis products therefrom, a pyrolysis according to this invention may be carried out in any of the usual ways, e. g. in the presence or absence of gaseous diluents or reaction catalysts, in accordance with the general procedure hereinbefore described. The rate of flow of the vapor mixture is such that the hydrocarbons are usually maintained at reaction temperature above 500° C. for less than two seconds and preferably less than one second. The invention permits carrying out of pyrolysis reactions in continuous manner and without excessive accumulation of polymeric material in the reactor or condenser, even when producing vinyl aromatic compounds such as vinyl-chlorobenzene or divinylbenzene, etc., which are far more susceptible to polymerization than styrene. For instance, the invention may be applied in pyrolyzing diethylbenzene to produce a mixture of ethyl-vinylbenzene and divenylbenzene; in pyrolyzing ethyl-vinylbenzene or a mixture thereof with diethylbenzene to produce divinylbenzene; in pyrolyzing ethyl-isopropylbenzene to form vinyl-isopropenylbenzene; in pyrolyzing di-isopropylbenzene to form di-isopropenyl-benzene and divinylbenzene; in pyrolyzing triethylbenzene to produce a mixture of products comprising diethyl-vinylbenzene, ethyl-divinylbenzene and a minor amount of trivinylbenzene; in pyrolyzing ethyl-fluorobenzene to form vinyl-fluorobenzene; in pyrolyzing isopropyl-fluorobenzene to form isopropenyl-fluorobenzene; in pyrolyzing ethyl-chlorobenzene to form vinyl-chlorobenzene; in pyrolyzing ethyl-methyl-chlorobenzene to form chloro-methyl-styrene; in pyrolyzing ethyl-bromobenzene to form vinyl-bromobenzene; in pyrolyzing isopropylbenzene to produce isopropenylbenzene; in pyrolyzing ethyl-toluene to produce a monomethyl-styrene; or in pyrolyzing ethyl-xylene to produce a dimethyl-styrene; etc.

The following examples describe ways in which the principle of the invention has been applied and illustrate certain of its advantages, but are not to be construed as limiting the scope of the invention:

EXAMPLE 1

The purpose of this example is to illustrate results obtained in an attempt to produce divinylbenzene by a conventional pyrolysis procedure without introduction of a polymerization inhibitor into the reaction vapors. This example, which describes an experiment under conditions outside the scope of the invention, is presented for purpose of comparison with Example 2 wherein an inhibitor is employed in accordance with the invention. Water and a hydrocarbon mixture containing approximately 75 per cent by weight of diethylbenzene, 24.75 per cent of ethylvinylbenzene and 0.25 per cent of divinylbenzene were admixed and passed, at rates corresponding to 484 grams of water and 162 grams of the hydrocarbon mixture per hour, downward through a heated pipe of 2 inches internal diameter. An upper section of the pipe was filled to a depth of 24 inches with ¼ inch Berl saddles and was heated to an extent such that during passage therethrough the mixture was vaporized and the vapors heated to a temperature of about 590° C. The lower section of the pipe was filled to a depth of 14 inches with a granular metal oxide dehydrogenation catalyst. The latter consisted of magnesium oxide intimately admixed with minor amounts of the oxides of iron, copper, and potassium as promotors. During passage through the bed of catalyst, the vapors were heated at reaction temperatures ranging from 600° to 625° C. Vapors flowing from the catalyst bed were passed to a cooling unit where the aromatic components were condensed. The condensate comprised unreacted diethylbenzene, ethyl-vinyl-benzene and divinylbenzene. Its degree of unsaturation, expressed in terms of the single compound, ethyl-vinylbenzene, corresponded to the presence of 70.4 per cent by weight of ethyl-vinylbenzene. After operating as just described for 58 hours, the pipe became plugged with polymeric material and the experiment was terminated. The polymer was removed by oxidation with air. The loss in weight during the oxidation indicated that the polymer had accumulated in amount corresponding to 1.86 per cent of the weight of the hydrocarbons used as starting materials, or 7.44 per cent of the combined weight of the ethyl-vinyl-benzene and divinylbenzene in the feed mixture. The hydrocarbons condensed from the reacted vapors corresponded to only 79.2 per cent of the weight of the hydrocarbons in the feed mixture. The low recovery of condensible products was apparently due to formation of polymeric material and gaseous by-products and because of mechanical losses resulting from the plugging which occurred.

EXAMPLE 2

The procedure of Example 1 was repeated, except that the feed mixture was treated with the polymerization inhibitor, 2.4-dichloro-6-nitrophenol, in amount corresponding to 0.5 per cent of the weight of the hydrocarbon starting materials and that the vapor temperature in the catalyst bed gradually increased from 600° to about 765° C. during the experiment. The reaction was carried out in continuous manner over a period of 75.5 hours, at which time an electric heating circuit failed and operation was discontinued. Hydrocarbons were condensed from the reacted vapors in amount corresponding to 98.7 per cent of the weight of the hydrocarbon starting materials. The hydrocarbon condensate comprised the products mentioned in Example 1 and had a degree of unsaturation which expressed in terms of a single compound, corresponded to the presence of 60.8 per cent by weight of ethyl-vinylbenzene. Visual inspection did not show the presence of polymeric material either in the preheating and reaction chamber or in the glass condensers which were used, but the Berl saddles and catalyst in said chamber did, of course, retain a small amount of absorbed organic material which might have included some polymer. The absorbed organic material was removed by oxidation, as in Example 1. It amount to only 0.085 per cent of the weight of the hydrocarbon starting materials or 0.34 per cent of the combined weight of ethyl-vinylbenzene and divinylbenzene in the feed mixture.

EXAMPLE 3

A series of experiments were carried out as described in Example 2, except that different polymerization inhibitors were employed in the separate experiments, the catalyst employed was an active form of bauxite known commercially as Florite, and that the hydrocarbon mixture employed as a starting material was one containing 75 per cent by weight of diethylbenzene, 23 per cent of ethyl-vinyl-benzene and 2 per cent of divinylbenzene. Each experiment was successful in that no appreciable amount of polymer accumulated either in the preheating and reaction chamber or in the condenser. In each experiment, the condensate was analyzed to determine the amount of the unchanged inhibiting agent retained therein. Also, the hydrocarbon layer of the condensate was analyzed to determine the proportions therein of diethylbenzene, ethyl-vinylbenzene, divinylbenzene and styrene and also of lower or higher boiling ingredients. The following table names the polymerization inhibitor employed in each experiment and states the amount thereof, both in grams and in per cent of the weight of hydrocarbons in the feed mixture. It states the temperatures at which the pyrolysis reactions were carried out and gives the proportions, as per cent by weight, of the several above-mentioned products in the hydrocarbon layer of the condensate. It also gives the weight of the inhibiting agent found to be present in the condensate. In the table, the symbols "S," "D. E. B.," "E. V. B.," and "D. V. B." are employed to designate the respective compounds styrene, diethylbenzene, ethyl-vinylbenzene and divinylbenzene.

Table

| Run No. | Inhibitor | | | Temp., °C. | Grams of Inhibitor in— | Condensate | | | | | |
|---|---|---|---|---|---|---|---|---|---|---|---|
| | | | | | | Organic Layer Contains— | | | | | |
| | Kind | Grams | Per cent | | | S, per cent | D. E. B. | E. V. B. | D. V. B. | Lower Boiling Ingreds. | Higher Boiling Ingreds. |
| 1 | 2.4-dichloro-6-nitrophenol | 21.2 | 0.71 | 600–640 | 0.5 | 2.0 | 39.0 | 39.9 | 7.3 | 10.8 | 1.0 |
| 2 | 2-chloro-4.6-dinitrophenol | 21.1 | 0.5 | 600–690 | 0.36 | 0.9 | 49.0 | 41.2 | 6.2 | 2.7 | nil |
| 3 | Tertiary-butyl catechol | 15.1 | 0.3 | 605–635 | 0.17 | 2.8 | 30.4 | 42.8 | 12.6 | 10.5 | 0.9 |
| 4 | Quinone | 18.0 | 0.34 | 600–673 | 1.75 | 0.9 | 46.2 | 43.1 | 5.0 | 4.8 | nil |
| 5 | Hydroquinone | 0.29 | 0.0006 | 600–642 | 0.17 | 5.7 | 27.9 | 39.3 | 14.2 | 9.7 | 3.2 |

EXAMPLE 4

The purpose of this example is to illustrate the effectiveness of a polymerization inhibitor in preventing the formation and accumulation of polymeric material in a reaction system during a pyrolysis to form isopropenylbenzene, i. e. alpha-methyl-styrene. In the first of two experiments, vapors consisting of three parts by weight of steam and one part of a mixture of 90 per cent by weight isopropylbenzene and 10 per cent isopropenylbenzine was passed through a preheater where the vapors were heated to 440° C. and thence downward through a reaction zone containing an upper layer of Berl saddles and a lower layer of a granular metal oxide dehydrogenation catalyst as described in Example 1. During the bed of catalyst, the vapors were heated to a pyrolysis temperature between 635° and 670° C. Vapors flowing from the bed of catalyst were passed to a cooling unit where the water and aromatic components were condensed. After operating as just described for a period of 15 hours, a considerable accumulation of solid polymeric material was observed in the line leading from the reaction zone to the condensing unit. At the end of 72 hours of continuous operation the back pressure, due to accumulation of polymers in the reaction system, was excessive and operation was discontinued. The polymer which had accumulated was removed. A portion of the solid polymer was immersed in approximately 100 times its weight of isopropylbenzine. After three days of standing in the isopropylbenzene, only about half of the polymer was dissolved. The organic layer of the condensate collected during the experiment was found to contain 41.2 per cent by weight of isopropenylbenzine.

The procedure in the second experiment was the same as that just described, except that 0.5 per cent by weight of 2.4-dichloro-6-nitrophenol was added to the vapor feed mixture and that the pyrolysis carried out over a period of 48 hours. At the end of said period the reaction system was dismantled and inspected. No polymer was found therein, i.e. the beds of Berl saddles and catalyst and also the preheater and condenser and the lines connecting these heat exchange units with the reaction zone were free of solid polymer. The organic layer of the condensate collected during the experiment was found to contain 38.8 per cent by weight of isopropenylbenzene.

EXAMPLE 5

The purpose of this example is to illustrate the effectiveness of a polymerization inhibitor in preventing the formation and accumulation of polymeric material during a pyrolysis to form a mixture of ortho- and para-chlorostyrenes. The procedure in each of two experiments was similar to that described in Example 1, except that vapors of 3 parts by weight of steam and one part of a hydrocarbon mixture containing 90 per cent by weight of ortho- and para-chloroethylbenzine and 10 per cent of ortho- and para-chlorostyrene were fed to the pyrolysis, the catalyst employed was activated alumina in granular form, the times of reaction and reaction temperatures were as stated below, and in one of the experiments 0.5 per cent by weight of 2.4-dichloro-6-nitrophenol was admixed with the vapor feed to the reaction zone. In the experiment carried out without such addition of 2.4-dichloro-6-nitrophenol, vapors flowing through the bed of catalyst were heated to a pyrolysis temperature between 320° and 350° C. and flow of the vapor mixture through the reaction zone was continued over a period of 45 hours, toward the end of which time a considerable back pressure against flow of the vapors had developed. After discontinuing the reaction, the reaction system was dismantled and examined. It was found that the Berl saddles in the upper section of the reaction chamber and an upper one-inch layer of the catalyst in the lower section of the chamber were cemented together by polymer. During the pyrolysis, vapors flowing from the reaction chamber were cooled to condense the aromatic products and the steam. The organic layer of the condensate was found to contain 25 per cent by weight of ortho- and para-chlorostyrene.

In the experiment wherein 2.4-dichloro-6-nitrophenol was added to the vapor feed mixture, the vapors were heated to temperatures between 640° and 700° C. during flow through the bed of catalyst and passage of the vapors through the reaction chamber was continued over a period of 36 hours. No increase in back pressure on the vapor feed was noted. Vapors flowing from the reaction chamber were cooled to condense the aromatic products and steam. The organic layer of the condensate collected throughout the reaction period was found to contain 30 per cent by weight of ortho- and para-chlorostyrene. After discontinuing the pyrolysis, the reaction system was dismantled and examined. No solid polymer was found therein.

EXAMPLE 6

This example illustrates the effectiveness of a polymerization inhibitor in preventing the formation and accumulation of resinous material in a reaction system during the pyrolysis of ethylxylene to form dimethyl-styrene. In each of two series of experiments, a vapor mixture of one part by weight of monoethylxylene (containing the several isomeric forms thereof together with a minor amount, i. e. about 10 per cent by weight, of diethylbenzene) and three parts of steam was passed through a bed of a granular aluminum oxide catalyst, where the vapors were heated to reaction temperatures between 620° and 700° C. Vapors flowing from the catalyst bed were cooled to condense the steam and the aromatic products. Except for the particular reactants and catalyst employed and other operating details hereinafter mentioned, the procedure was as described in claim 1. Each "series" of experiments amounted, in fact, to the carrying out of a single pyrolysis with periodic interruptions of the reaction. In one series of experiments no polymerization inhibitor was added to the reaction vapors. At the end of a total of 337.5 hours of operation, the outlet from the reaction zone became plugged with a solid resinous material which had formed and accumulated during the reaction. The organic layer of the condensate collected during the reaction contained between 30 and 40 per cent by weight of dimethyl-styrene, i. e. vinylxylene. In the second series of experiments, a solution of 10 per cent by weight of the polymerization inhibitor, tertiary-butylcatechol, in ethylxylene was injected into the reaction vapors flowing from the bed of catalyst, the amount of the solution thus added being such as to form a 0.5 per cent solution of tertiary-butylcatechol in the organic layer of the condensed products. After operating in this manner for a total of 378 hours, the reaction was discontinued and the apparatus was dismantled and examined. The reaction system was found to be free of solid resinous material. The organic layer of the condensate collected during the reaction contained between 32 and 40 per cent of dimethyl-styrene.

In a third series of experiments, a vapor mixture consisting of one part by weight of ethyl-xylene which had been recovered by distillation from prior pyrolysis mixtures and which contained between 10 and 20 per cent by weight of dimethyl-styrene, three parts of steam, and 0.005 part of the polymerization inhibitor, 2.4-dichloro-6-nitrophenol, was fed to a reaction chamber containing a granular aluminum oxide catalyst heated to temperatures between 620° and 700° C. A 10 per cent solution of tertiary-butylcatechol in ethyl-xylene was injected into the vapors at approximately the point of flow from the bed of catalyst in amount sufficient to form a 0.5 per cent solution of the tertiary-butylcatechol in the aromatic products. Except for the composition of the feed mixture, the procedure was similar to that in the second of the foregoing series of experiments. Vapors flowing from the bed of catalyst were cooled to condense the steam and the aromatic components thereof. After a total of 325 hours of operation, the reaction was discontinued and the reaction system was dismantled and examined. No solid resinous material was found therein. The organic layer of the condensate collected during the reaction was found to contain between 35 and 40 per cent by weight of dimethyl-styrene.

EXAMPLE 7

A hydrocarbon mixture consisting of approximately 81 per cent by weight of ortho-chloro-ethylbenzene, 9.8 per cent of ortho-chloro-styrene and 4 per cent of styrene was treated with 0.51 per cent of its weight of 2.4-dichloro-6-nitrophenol. The mixture was passed in steady flow first through a heating zone where it was vaporized and brought to a temperature above 200° C. and thence through a heated bed of a granular aluminum oxide catalyst where it was further heated to a pyrolysis temperature of approximately 635° C. Vapors flowing from the bed of catalyst were cooled to condense the organic product and the condensate was analyzed to determine the proportion of 2.4-dichloro-6-nitrophenol retained therein. It was found that out of a total of 54.4 grams of said compound introduced in the feed mixture, 2.6 grams of the compound were retained in the condensate. No accumulation of polymeric material in the reaction system or in the condenser was observed. The organic layer of the condensate was found to consist of approximately 52.9 per cent by weight of ortho-chloro-ethylbenzene, 32.3 per cent of ortho-chlorostyrene, 6.8 per cent of styrene, 7.7 per cent of ingredients boiling below styrene and only 0.3 per cent of ingredients having boiling points higher than those just mentioned.

Other modes of applying the principles of the invention may be employed instead of those explained, change being made as regards the method herein disclosed providing the step or steps stated by any of the following claims or the equivalent of such stated step or steps be employed.

We therefore particularly point out and distinctly claim as our invention:

1. In a method of making a polymerizable alkenyl-aromatic compound having a molecular weight greater than that of styrene, the steps which consist in passing a vapor mixture comprising an alkylated aromatic compound having a molecular weight greater than that of ethylbenzene and having at least two carbon atoms in an alkyl radical thereof and a minor amount of a polymerization inhibitor through a reaction zone where the vapors are heated to a reaction temperature between 500° and 850° C. and cooling vapors flowing from said zone to condense the polymerizable product.

2. A method which comprises passing a vapor mixture of an alkylated benzene compound selected from the class consisting of diethylbenzene, ethyl-chlorobenzene, ethyl-bromobenzene, isopropylbenzene, and ethyl-xylene, together with a minor amount of a polymerization inhibitor through a reaction zone where the vapors are heated to a reaction temperature between 500° and 800° C. and cooling vapors flowing from said zone to condense the polymerizable product.

3. A method, as described in claim 1, wherein the vapor feed to the reaction zone comprises the alkylated benzene compound which is to be pyrolyzed, steam in amount exceeding the weight of the alkylated benzene compound, and a minor amount of a polymerization inhibitor.

4. A method, as described in claim 1, wherein the polymerization inhibitor is a chloronitrophenol.

5. A method, as described in claim 2, wherein the vapor feed to the reaction zone comprises the alkylated benzene compound, at least an equal weight of steam, and a minor amount of a polymerization inhibitor.

6. A method, as described in claim 2, wherein the vapor feed to the reaction zone comprises the alkylated benzene compound, at least an equal weight of steam and a minor amount of a halonitrophenol.

7. A method, as described in claim 2, wherein the vapor feed to the reaction zone comprises diethylbenzene, at least an equal weight of steam and a minor amount of a polymerization inhibitor.

8. A method, as described in claim 2, wherein the vapor feed to the reaction zone comprises diethylbenzene together with a lesser amount of ethyl-vinylbenzene, steam in amount at least equal to the combined weight of the diethylbenzene and ethyl-vinylbenzene, and a minor amount of a polymerization inhibitor.

9. A method, as described in claim 2, wherein the vapor feed to the reaction zone comprises diethylbenzene together with a lesser amount of ethyl-vinylbenzene, steam in amount at least equal to the combined weight of the diethylbenzene and ethyl-vinylbenzene, and a minor weight of a chloronitrophenol.

10. A method, as described in claim 2, wherein the vapor feed to the reaction zone comprises ethyl-chlorobenzene, at least an equal weight of steam, and a minor amount of a polymerization inhibitor.

11. A method, as described in claim 2, wherein the vapor feed to the reaction zone comprises ethyl-chlorobenzene, a lesser amount of vinyl-chlorobenzene, steam in amount at least equal to the combined weight of the ethyl-chlorobenzene and vinyl-chlorobenzene, and a minor amount of a polymerization inhibitor.

12. A method, as described in claim 2, wherein the vapor feed to the reaction zone comprises ethyl-chlorobenzene together with a lesser amount of vinyl-chlorobenzene, steam in amount at least equal to the combined weight of the ethyl-chlorobenzene and vinyl-chlorobenzene, and a minor amount of a chloronitrophenol.

13. A method, as described in claim 2, wherein the vapor feed to the reaction zone comprises isopropylbenzene, at least an equal weight of steam, and a minor amount of the polymerization inhibitor.

14. A method, as described in claim 2, wherein the vapor feed to the reaction zone comprises isopropylbenzene together with a lesser amount of isopropenylbenzene, steam in amount at least equal to the combined weight of the isopropylbenzene and isopropenylbenzene, and a minor amount of a polymerization inhibitor.

15. A method, as described in claim 2, wherein the vapor feed to the reaction zone comprises isopropylbenzene together with a lesser amount of isopropenylbenzene, steam in amount at least equal to the combined weight of the isopropylbenzene and isopropenylbenzene, and a minor amount of a chloronitrophenol.

16. In a method of making a polymerizable alkenyl-aromatic compound having a molecular weight greater than that of styrene, the steps which consist in passing a vapor mixture comprising an alkylated aromatic compound, having a molecular weight greater than that of ethylbenzene and having at least two carbon atoms in an alkyl radical thereof, and a minor amount of a polymerization inhibitor through a reaction zone where the vapors are heated to a reaction temperature between 500° and 850° C., adding a minor amount of a polymerization inhibitor to the vapor mixture which flows from said zone, and thereafter cooling the effluent vapors to condense the polymerizable product.

JAMES L. AMOS.
FREDERICK J. SODERQUIST.

REFERENCES CITED

The following references are of record in the file of this patent:

UNITED STATES PATENTS

| Number | Name | Date |
| --- | --- | --- |
| 2,110,830 | Dreisbach | Mar. 8, 1938 |
| 2,191,240 | Stevens et al. | Feb. 20, 1940 |
| 2,240,764 | Dreisbach et al. | May 6, 1941 |
| 2,295,077 | Dreisbach et al. | Sept. 8, 1942 |
| 2,304,728 | Boyer et al. | Dec. 8, 1942 |
| 2,397,653 | Erickson | Apr. 2, 1946 |